(12) United States Patent
Birka (10) Patent No.: US 9,555,569 B2
(45) Date of Patent: Jan. 31, 2017

(54) PLASTIC OVERMOLDING OF ALUMINUM EXTRUSIONS

(71) Applicant: Magna International Inc., Aurora (CA)

(72) Inventor: Mark Peter Birka, Northville, MI (US)

(73) Assignee: MAGNA EXTERIORS INC., Concord, Ontario (CA)

( * ) Notice: Subject to any disclaimer, the term of this patent is extended or adjusted under 35 U.S.C. 154(b) by 44 days.

(21) Appl. No.: 14/389,617

(22) PCT Filed: Mar. 28, 2013

(86) PCT No.: PCT/US2013/034292
§ 371 (c)(1),
(2) Date: Sep. 30, 2014

(87) PCT Pub. No.: WO2013/148959
PCT Pub. Date: Oct. 3, 2013

(65) Prior Publication Data
US 2015/0056428 A1 Feb. 26, 2015

Related U.S. Application Data (60) Provisional application No. 61/618,071, filed on Mar. 30, 2012.

(51) Int. Cl.
*B29C 45/14* (2006.01)
*B29D 23/00* (2006.01)
(Continued)

(52) U.S. Cl.
CPC ......... *B29C 45/14598* (2013.01); *B05D 3/102* (2013.01); *B29C 45/14778* (2013.01);
(Continued)

(58) Field of Classification Search
CPC ............... Y10T 428/24917; Y10T 428/31678; B29L 2031/3002; B29K 2705/02; B29K 2101/00; B29D 23/00; B05D 2254/02; B05D 2350/60; B05D 3/102; B29C 45/1418; B29C 45/14311; B29C 45/14467; B29C 45/18; B29C 45/14598; B29C 45/14836; B29C 45/14778; B62D 21/11; B62D 29/004; B62D 29/008; B62D 25/085; B62D 25/145; B62D 21/15; B62D 21/152; B62D 29/001; B60R 19/02; B60R 2019/182; B60R 2019/1806; B60R 2019/1813; A63C 17/223; B32B 1/00; B32B 1/06; B32B 1/08
(Continued)

(56) References Cited

U.S. PATENT DOCUMENTS

| 4,211,179 A | 7/1980 | Saunders |
| 2012/0068497 A1* | 3/2012 | Kia ................ B60R 19/03 296/187.03 |

FOREIGN PATENT DOCUMENTS

| EP | 0 967 138 A2 | 12/1999 |
| GB | 2 350 655 A | 12/2000 |
| WO | 98/04400 A1 | 2/1998 |

OTHER PUBLICATIONS

Translation of WO 98/04400 A1.*
International Search Report for International Application No. PCT/US2013/034292, mailed Jun. 12, 2013.

* cited by examiner

*Primary Examiner* — Catherine A Simone
(74) *Attorney, Agent, or Firm* — Warn Partners, P.C.

(57) ABSTRACT

A plastic overmold aluminum extrusion including at least one plastic overmold and aluminum extrusion. The aluminum extrusion is formed with sufficient cross sectional properties and features such as an internal web to help prevent undesirable collapses under injection or compression molding pressures. This improves part geometry and strength while minimizing weight. A plurality of protrusions and/or local deformations on an outer wall of the extrusion can be used to create strong mechanical interface to the plastic. Localized deformations can result from a combination of the applied plastic pressure under injection or compression molding pressures and the proximity of outer gaps of the internal web structure. A process of making the plastic overmold aluminum extrusion includes inserting at least one aluminum extrusion into a mold without mandrels and delivering plastic forming the plastic overmold.

18 Claims, 7 Drawing Sheets

(51) Int. Cl.
    *B62D 29/00*         (2006.01)
    *B05D 3/10*          (2006.01)
    *B29L 31/30*         (2006.01)
    *B29C 43/18*         (2006.01)
    *B29K 705/02*        (2006.01)
    *B62D 21/11*         (2006.01)
    *B62D 25/08*         (2006.01)
    *B62D 25/14*         (2006.01)
    *B29K 101/00*        (2006.01)

(52) U.S. Cl.
    CPC ........... B29D 23/00 (2013.01); B62D 29/004 (2013.01); B62D 29/008 (2013.01); *B05D 2254/02* (2013.01); *B05D 2350/60* (2013.01); *B29C 43/18* (2013.01); *B29C 45/1418* (2013.01); *B29C 45/14311* (2013.01); *B29C 45/14467* (2013.01); *B29C 45/14836* (2013.01); *B29K 2101/00* (2013.01); *B29K 2705/02* (2013.01); *B29L 2031/3002* (2013.01); *B62D 21/11* (2013.01); *B62D 25/085* (2013.01); *B62D 25/145* (2013.01); *Y10T 428/24917* (2015.01); *Y10T 428/31678* (2015.04)

(58) Field of Classification Search
    USPC .................................................. 428/188, 457
    See application file for complete search history.

PLASTIC OVERMOLDING OF ALUMINUM EXTRUSIONS

CROSS REFERENCE TO RELATED APPLICATIONS

This application is a National Stage of International Application No. PCT/US2013/034292, filed Mar. 28, 2013. This application claims the benefit of U.S. Provisional Application No. 61/618,071 filed Mar. 30, 2012. The disclosures of the above applications are incorporated herein by reference.

FIELD OF THE INVENTION

The present invention relates to metal extrusions for plastic overmolding. In particular, a plastic overmold aluminum extrusion and process for making same.

BACKGROUND OF THE INVENTION

The use of a steel structure enclosed by plastic for improving part strength of components used in transportation vehicle structure is known. Generally, enclosed structures can be used in applications such as cross car members. Typically, a tube such as a hollowed steel tube is used to provide additional structure for the system. The steel tube is inserted in a compression mold and mandrels are inserted into the ends of the tube prior to compression in order to prevent collapse of the tube during the molding process. The mandrels are typically removed during compression and the steel tube remains enclosed by the plastic. This process results in a slower cycle time for molding and a relatively heavy product. It is known that if mandrels are not used the steel tube structure can be crushed or otherwise disadvantageously compressed during injection molding under pressure from at least about 12,000 psi to 20,000 psi.

Therefore, there remains a need in the art to replace the heavy and expensive steel tube with an aluminum extrusion with sufficient cross sectional properties to help prevent collapse with plastic overmold for improving part geometry and strength while minimizing weight, and a process of plastic overmolding of the aluminum extrusion without the use of mandrels.

SUMMARY OF THE INVENTION

In accordance with the present invention there is provided a metallic extrusion with plastic overmold for improving part geometry and strength while minimizing weight for a component of a transportation vehicle. An aluminum extrusion with sufficient cross sectional properties is used to prevent undesirable collapses and/or provide desired predictable localized collapses under injection or compression molding pressures. The aluminum extrusion can have an internal web structure, and/or suitable features that create mechanical interfaces to the plastic, and/or the extrusion can provide localized deformations that would result in very strong mechanical interfaces to the plastic. Using the aluminum extrusion in place of steel tubes improves the part geometry and strength while minimizing weight.

Also provided in the present invention is a process for making a plastic overmolded aluminum extrusion. In the process of the present invention an aluminum extrusion is formed with sufficient cross sectional properties. Thereafter, at least one aluminum extrusion is inserted into an injection mold and plastic is delivered to the mold via conventional means. The structure is produced by the plastic substantially enclosing the aluminum extrusion and forming a desired shape effective as parts used in transportation vehicles. Additional parts can also be integrated into a single structure.

One of the advantages is that the present invention eliminates the mandrels required in conventional processes. This would further reduce the cycle time for molding. The present invention also allows integration of a plurality of parts into a single structure. At least two aluminum extrusions can be inserted into the injection mold and plastic delivered to the mold, and/or at least two aluminum extrusions can be welded or otherwise affixed to one another and/or to a metal core before inserting into an injection mold and delivering plastic to the mold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the drawings generally, in accordance with the present invention there is provided a plastic overmold aluminum extrusion, generally shown at 10, including an aluminum extrusion, generally shown at 12, and a plastic overmold, generally shown at 14, for improved part geometry and strength while minimizing part weight. The plastic overmold 14 covers at least the aluminum extrusion 12 of the structural area of a part.

The aluminum extrusion 12 of the present invention is compatible with various plastics, fiber-reinforced plastic materials, short glass fiber nylon, thermoplastic polyolefin, and any other type of suitable plastic. For example, the plastic overmold can be of polypropylene capable of painting. The structure can also be electrocoat (E-coat) capable with long term stability. A particularly preferred material for use in the present invention is fiber reinforced polypropylene or fiber reinforced nylon. Any fibers selected for the present invention are those suitable for formulation with the plastic chosen for overmolding and which provide suitable mechanical and flowability properties. Other fillers, resins, additives and components may be included provided they do not adversely affect the physical and particularly the geometric and strengthening properties of the present invention.

The aluminum extrusion 12 also provides molding of complicated shape applications and selective integration of a plurality of parts into a single structure. In accordance with the present invention, the aluminum extrusion 12 has sufficient cross sectional features used to prevent undesirable collapses under injection or compression molding pressures. The aluminum extrusion 12 can have an internal web structure for strengthening, improved geometry and weight, and/or outward features that create mechanical interfaces to the plastic, and/or the extrusion can provide predetermined local deformation(s) that result in very strong mechanical interfaces to the plastic.

The plastic overmold aluminum extrusion 10 can be used in applications such as transportation vehicle front end structures, bumper beams, cross car beams, instrument panel reinforcements, engine cradles, transmission cross members, or any other component and field requiring improved part geometry and strength, while minimizing weight and/or processing time and costs. Alternative aluminum extrusion 12 cross sectional properties sufficient to prevent undesirable collapses under injection or compression molding pressures is contemplated within the teachings of the invention.

Figure 1:
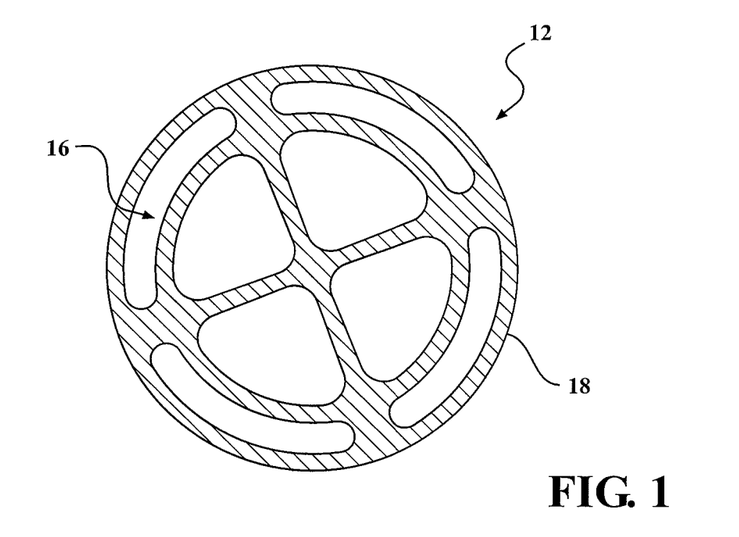
FIG. 1 is a sectional view taken along section 2-2 of FIG. 2 of an aluminum extrusion for overmolding, in accordance with an embodiment of the present invention.
Figure 2:
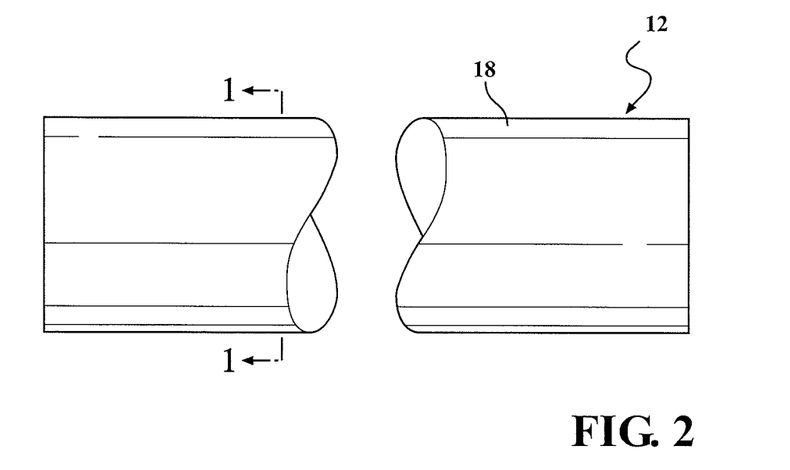
FIG. 2 is a front elevation view of the exemplary aluminum extrusion of FIG. 1 for overmolding, in accordance with the present invention.

FIG. 1 is a sectional view of an aluminum extrusion 12 for overmolding of FIG. 2, in accordance with one embodiment of the present invention. An internal web 16 or web-like structure, generally shown at 16, is provided for reinforcement to help prevent a collapse of the aluminum extrusion 12 and plastic overmold 14 under injection or compression molding pressures and eliminates the need for mandrels. The internal web 16 also improves strength of the finished part including when installed into the transportation vehicle. The outer surface of the outer wall 18 of the aluminum extrusion 12 can be free from protrusions and recesses. The outer wall 18 is not open along its length.

FIG. 2 is a front elevation view of the aluminum extrusion 12 of FIG. 1, depicted as substantially tubular and broken along its length to illustrate that the aluminum extrusion 12 can be any length. It is further understood that the aluminum extrusion 12 can have any alternative shape and can have additional structures and/or mounting plates welded to it. Therefore, the aluminum extrusion 12, and/or any additional structures welded thereto, can alternatively form a curved, rectangular, triangular, square, hexagonal, or any other desirable cross section or configuration, and combinations thereof. The aluminum extrusion 12 cross section is not channel-shaped. The internal web 16 preferably extends the length of the aluminum extrusion 12.

Figure 3:
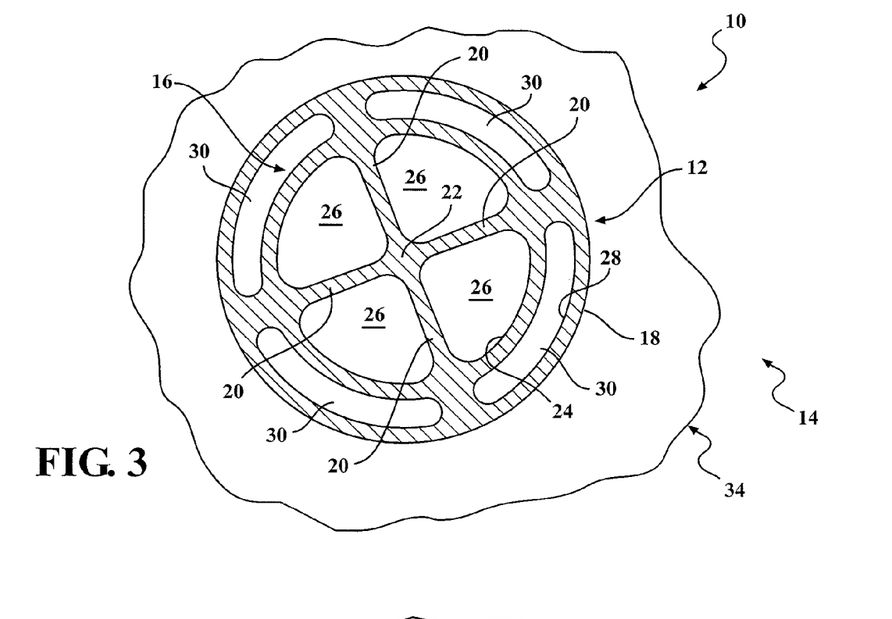
FIG. 3 is a sectional view of the aluminum extrusion of FIGS. 1-2 with a plastic overmold, in accordance with the present invention.

FIG. 3 is a sectional view of the plastic overmold aluminum extrusion 10 depicting a plastic overmold 14 enclosing the outer wall 18 of the aluminum extrusion 12. The internal web 16 of the aluminum extrusion 12 comprises at least two interconnected segments 20, preferably at least four segments that are integrally formed, that extend generally from the center 22 of the cross sectional area of the extrusion and extend radially to an inner wall 24 thereby forming internal gaps 26 that are generally quadrant-like shapes or sectors of a circle. The interconnected segments 20 further extend radially to an inner surface 28 of the outer wall 18 forming elongated curved kidney-like shaped outer gaps 30 between the inner wall 24 outer surface and the outer wall 18 inner surface. This internal web 16 is illustrative of a reinforcement arrangement to help prevent or elimination undesirable collapses and/or deformations under injection or compression molding pressures. It is understood that alternative internal web 16 arrangements having sufficient cross sectional properties can be employed.

The plastic overmold 14 can be any operable shape for installation. For example, the outer surface, generally shown at 34, of the plastic overmold 14 can be shaped for use in applications such as transportation vehicle front end structures, bumper beams, cross car beams, instrument panel reinforcements, engine cradles, transmission cross members, or any other component requiring improved part geometry and strength, while minimizing weight.

Figure 4:
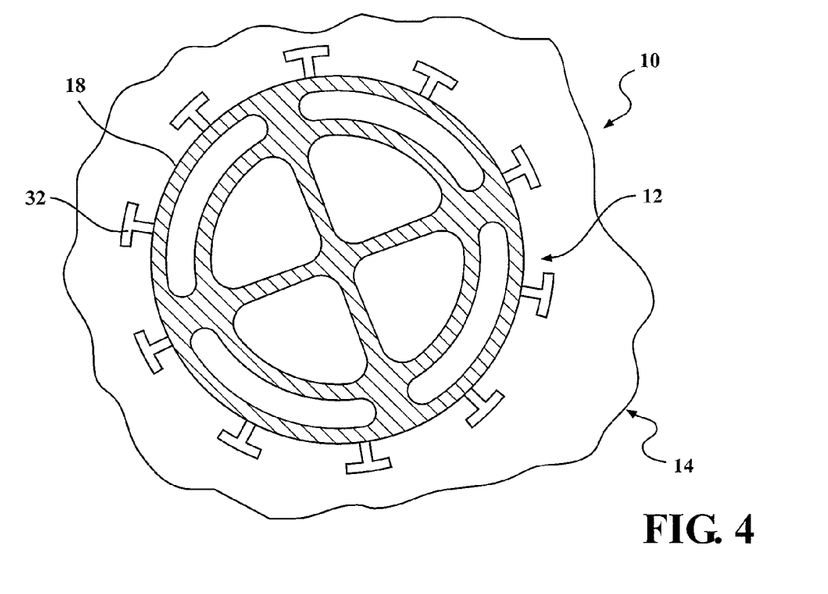
FIG. 4 is a sectional view of a plastic overmolded aluminum extrusion including protruding features, in accordance with another embodiment of the present invention.

FIG. 4 is a sectional view of the aluminum extrusion 12 for overmolding having protruding features, in accordance with another embodiment of the present invention. A plurality of protrusions 32 that are T-shaped are connected to or formed on the outer wall 18 surface of the aluminum extrusion 12 to create mechanical interfaces to the plastic, e.g., grip the plastic. The protrusions 32 can assist the plastic overmold 14 in gripping to the aluminum extrusion 12. Thus, the protrusions 32 can interface with the plastic overmold 14 for additional strength, rigidity, and hold. Larger protrusions 32 and alternative sizes, shapes and configurations are contemplated suitable for gripping with additional plastic parts and/or interconnecting with features of the transportation vehicle structure for installation. The protrusions 32 are metallic, most preferably aluminum. The protrusions 32 can additionally be extruded with the aluminum extrusion body and/or welded to the aluminum extrusion 12.

Figure 5:
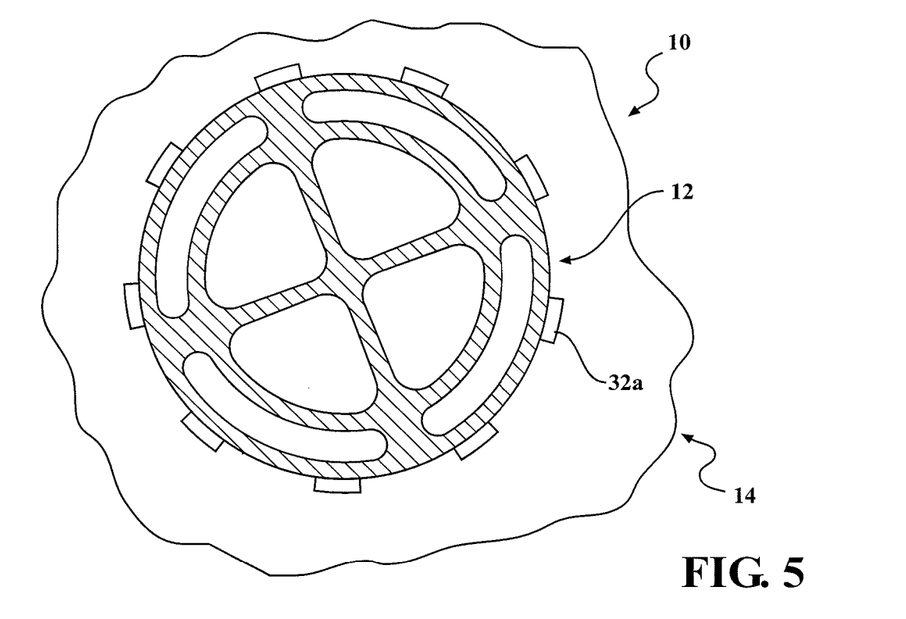
FIG. 5 is a sectional view of a plastic overmolded aluminum extrusion including protruding features, in accordance with another embodiment of the present invention.
Figure 6:
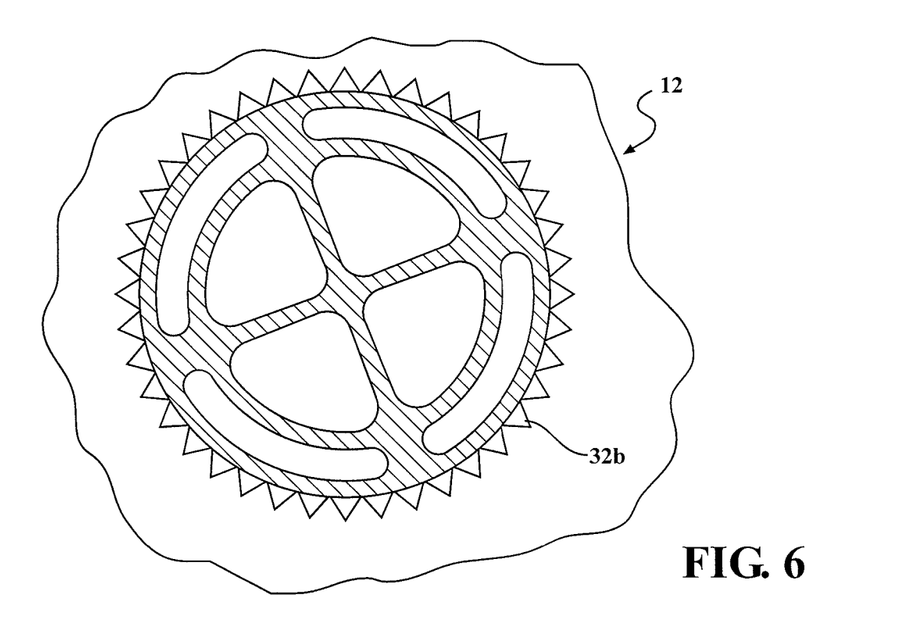
FIG. 6 is a sectional view of an aluminum extrusion for overmolding including protruding features, in accordance with another embodiment of the present invention.
Figure 7:
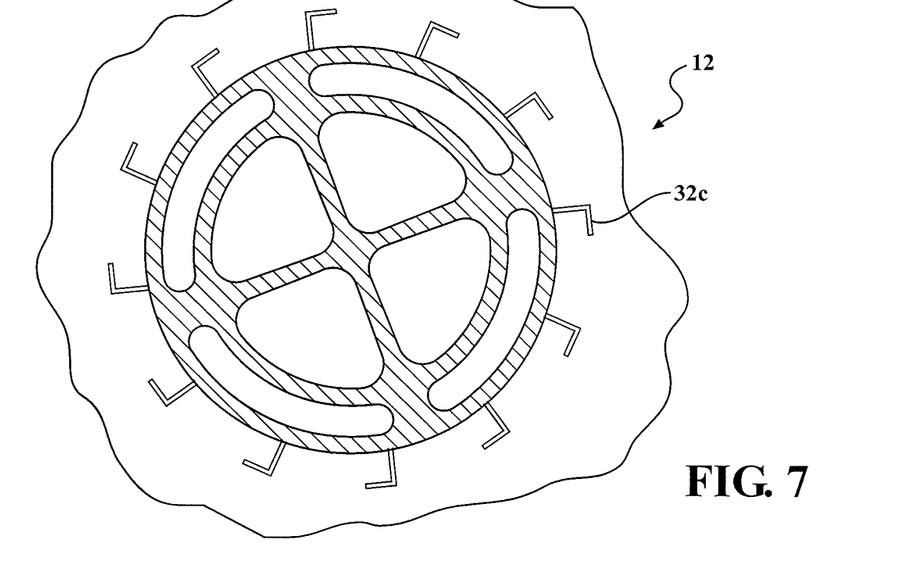
FIG. 7 is a sectional view of an aluminum extrusion for overmolding including protruding features, in accordance with another embodiment of the present invention.

The plurality of protrusions 32 can alternatively be rectangular shaped (FIG. 5, 32*a*), teeth-like, pointed contiguous teeth-like (FIG. 6, 32*b*), ribs, rims, prongs, T-shaped, L-shaped or barb-like shaped (FIG. 7, 32*c*), and any other shape suitable to protrude outward from the outer wall 18 to create mechanical interfaces with the plastic overmold 14. The plurality of protrusions 32 are operably spaced, preferably substantially evenly spaced, around the circumference of the aluminum extrusion 12 and can additionally extend at least partially along the length of the aluminum extrusion 12. The plurality of protrusions 32 can alternatively, or in combination, be abutting protrusions 32.

Referring to FIGS. 1-7 generally, the outer wall 18 of the aluminum extrusion 12 made in accordance with the present invention is generally operably thick enough to withstand injection or compression molding pressures such that the outer wall 18 does not sink, e.g., as in collapse, crush or deform, inward toward the internal web 16. Preferably, the aluminum extrusion 12 can withstand at least about 20,000 pounds per square inch (psi) of injection or compression molding pressures. The outer wall 18 of the aluminum extrusion 12 made in accordance with the present invention is typically at least 2.00 millimeters thick.

Figure 8:
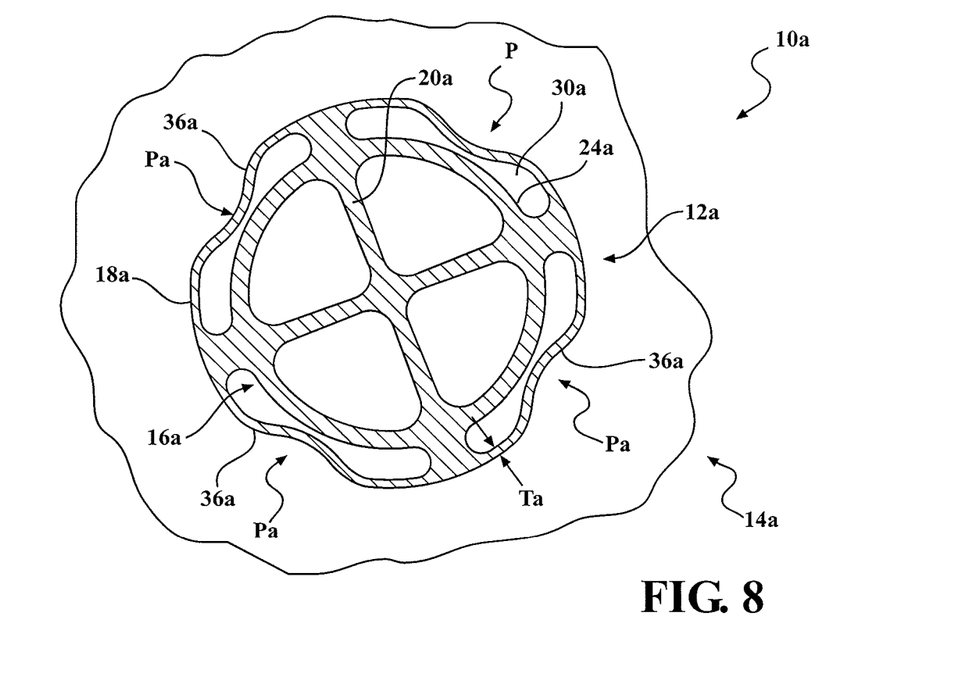
FIG. 8 is a sectional view of a plastic overmolded aluminum extrusion including deformations, in accordance with another embodiment of the present invention.

FIG. 8 is a sectional view of a plastic overmold aluminum extrusion 10*a*, in accordance with another embodiment of the present invention. The plastic overmold aluminum extrusion 10*a* is similar to the plastic overmold aluminum extrusion 10 shown in FIGS. 1-3. However, the aluminum extrusion 12*a* for plastic overmolding allows a plurality of deformations 36 to form under injection or compression molding pressures in predetermined locations. The deformations 36 are engineered for providing a strong mechanical interface with the plastic overmold 14*a*. Prior to application of injection or compression molding pressures, the structure of the aluminum extrusion 12*a* can be substantially similar to that of FIGS. 1-2, except that the thickness Ta of the outer wall 18*a* made in accordance with this embodiment is typically at least partially thinner to allow the localized deformation. Thus, the internal web 16*a* and elongated curved kidney-like shaped outer gaps 30*a* between the inner wall 24*a* and the outer wall 18*a* can be similar prior to applied pressure. However, when pressure is applied by the plastic delivered to the mold to form the plastic overmold 14*a*, the plastic pushes on the outer wall 18*a* causing predetermined portions of the outer wall 18*a* to collapse locally for mechanical strength and plastic overmold 14*a* interface. Pressure is illustrated by arrows Pa. The resultant deformations 36 are caused by a combination of the applied plastic pressure under injection or compression molding pressures and the proximity of the outer gaps 30*a*. The outer wall 18*a* does not curve inward where the interconnected segments 20*a* meet the outer wall 18*a*. It is understood that dimensions of the internal web 16*a* may be increased/decreased an operable amount to correlate with desired outer wall 18*a* thickness and aluminum extrusion 12*a* diameter to the perimeter. Deformations 36 in combination with at least one protrusion, e.g., plurality of protrusions 32, 32*a*, 32*b*, 32*c*, suitable to protrude outward from the outer wall 18*a* to create mechanical interfaces with the plastic overmold 14*a*, can also be used in the present invention, preferably, in areas where there are no deformations 36.

Figure 9:
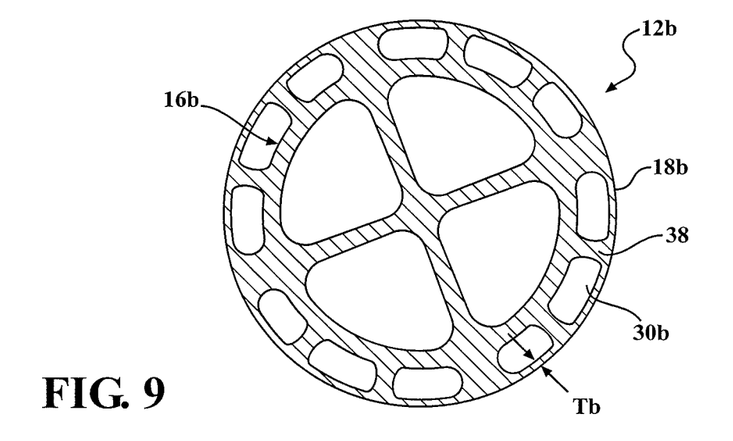
FIG. 9 is a sectional view of an aluminum extrusion for overmolding, in accordance with another embodiment of the present invention.
Figure 10:
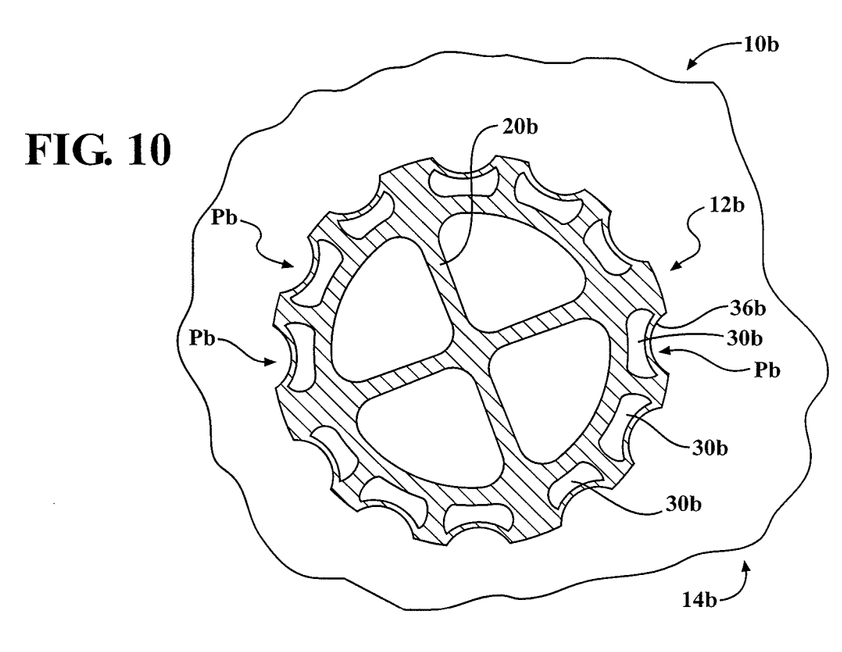
FIG. 10 is a sectional view of the aluminum extrusion of FIG. 9 including deformations, in accordance with the present invention.

FIGS. 9-10 are sectional views of a plastic overmold aluminum extrusion 10*b*, in accordance with another embodiment of the present invention. The plastic overmold aluminum extrusion 10*b* is similar to the plastic overmold aluminum extrusion 10 shown in FIGS. 1-3. However, the aluminum extrusion 12*b* for plastic overmolding in accordance with this embodiment allows a plurality of deformations 36*b* to form under injection or compression molding pressures. The deformations 36*b* are engineered for providing a strong mechanical interface with the plastic overmold 14*b*. FIG. 9 illustrates the aluminum extrusion 12*b* prior to application of injection or compression molding pressures. The structure of the aluminum extrusion 12*b* can be substantially similar to that of any of FIGS. 1-3 and 8, except that each elongated curved kidney-like shaped outer gap is replaced with at least two kidney-like outer gaps 30*b* that are shorter and a wall 38 is located between adjoining outer gaps 30*b*. By way of non-limiting example, three outer gaps 30*b* can occupy about the same amount of space as one outer gap 30,30*a* shown in FIGS. 1-8 and two walls 38 that are curved form the middle gap 30*b* bounded by two gaps 30*b*. In addition, the thickness Tb of the outer wall 18 made in accordance with this embodiment is typically thinner than the embodiments illustrated in FIGS. 1-3 to allow the localized deformation. As best depicted in FIG. 10, when pressure is applied by the plastic delivered to the mold to form the plastic overmold 14*b*, the plastic pushes on the outer wall 18*b* causing portions of the outer wall 18*b* to collapse locally for mechanical strength and plastic overmold 14*b* interface. Some of the pressure is illustrated by arrows Pb. The resultant deformations 36*b* are caused by a combination of the applied plastic pressure under injection or compression molding pressures and the proximity to the outer gaps 30*b*. The outer wall 18*b* does not curve inward where the interconnected segments 20*b* meet the outer wall 18*b*. It is understood that dimensions of the internal web 16*b* may be increased/decreased an operable amount to correlate with desired outer wall 18*b* thickness and aluminum extrusion 12*b* diameter to the perimeter. Deformations 36*b* in combination with at least one protrusion, e.g., plurality of protrusions 32, 32*a*, 32*b*, 32*c*, suitable to protrude outward from the outer wall 18*b* to create mechanical interfaces with the plastic overmold 14*b*, can also be used in the present invention, preferably, in areas where there are no deformations 36*b*.

In accordance with another embodiment of the present invention, several parts are integrated into a single structure. Referring to the drawings generally, and more particularly to FIG. 11, there is provided a complex extruded section in a plastic metal hybrid component. At least two aluminum extrusions 12 can be inserted into an injection mold and plastic delivered to the mold, and/or at least two aluminum extrusions 12 can be connected, preferably by welding, to one another and/or to a metal core before inserting into an injection mold and delivering plastic to the mold. The aluminum extrusions 12 can have different shapes from one another and the plastic overmold 14 allows this plurality of parts to be integrated into a single structure that can be installed into a transportation vehicle. This improves structure geometry, dimensional tolerances and strength and reduces installation time and handling.

In accordance with the process aspects of the present invention, there is provided a process for making a plastic overmold aluminum extrusion comprising first extruding the aluminum extrusion 12 forming a part with sufficient cross sectional properties. At least one aluminum extrusion 12 is inserted into an injection mold and plastic is delivered to the mold using conventional means forming the plastic overmold portion 14. The structure is produced by the plastic substantially enclosing the aluminum extrusion and forming a desired shape effective as a part used in transportation vehicles. The present invention also eliminates the mandrels required in conventional processes. This further reduces the cycle time for molding, costs, and weight. In addition, if protrusions 32 are used the protrusions 32 are affixed to, preferably by welding, to the aluminum extrusion 12, or extruded with or on the aluminum extrusion 12, prior to placing into the mold. Resistive implant welding is also contemplated. Alternatively, additional parts are inserted into the mold and/or affixed to the aluminum extrusions 12 and/or a metal core prior to insertion into the mold such that a plurality of parts can be integrated into a single structure. Thus, at least two aluminum extrusions 12 can be inserted into an injection mold and plastic delivered to the mold, and/or at least two aluminum extrusions 12 can be welded to one another and/or to a metal core before inserting into an injection mold and delivering plastic to the mold.

It is understood that in accordance with the present invention, aluminum extrusions 12*a* and/or 12*b* can additionally, or alternatively, be used for plastic overmolding to allow a plurality of deformations 36a,36b to form under injection or compression molding pressures in predetermined locations.

Figure 11:
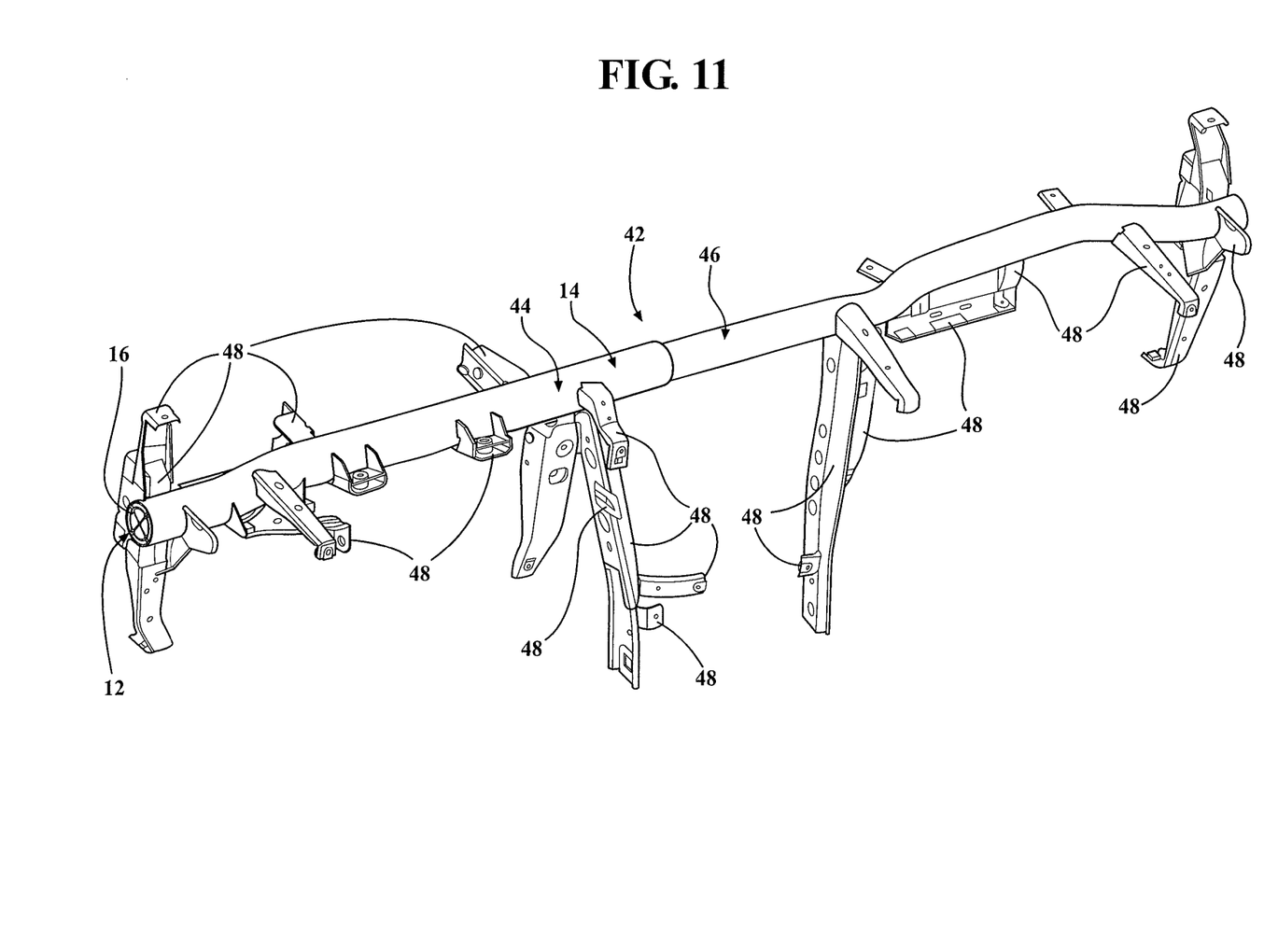
FIG. 11 is a perspective view of a part manufactured in accordance with the teachings of the present invention.

FIG. 11 is a perspective view of an exemplary part manufactured in accordance with the teachings of the present invention. The plastic overmold aluminum extrusion shown in FIG. 11 is a beam structure for an instrument panel for a transportation vehicle. A plastic overmold aluminum extrusion is generally shown at 42 and includes at least one aluminum extrusion 12 with at least an internal web 16 and a plastic overmold 14. The plastic overmold aluminum extrusion 42 can, for example, comprise a first portion 44 and a second portion 46 to form an instrument panel beam. While the first and second portions 44,46 are depicted with different diameters, it is understood that any other diameters and contouring are contemplated if suitable for providing mechanical and strengthening properties, while minimizing weight. At least one aluminum extrusion 12, most preferably at least two aluminum extrusions 12, are placed in the mold and plastic is delivered to the mold to form the plastic overmold 14. Optionally, at least two aluminum extrusions 12 and any other additional parts, can be welded together and/or to a core and then placed into the mold where plastic is delivered. By way of non-limiting example, any number of a variety of brackets, mounting plates, and any other parts 48 or mounting components, are contemplated and can be formed in the molding process. The at least one aluminum extrusion 12 can have different shapes and the present invention allows a plurality of parts to be integrated into a single structure that can be installed into an instrument panel of a transportation vehicle, for example.

Figure 12:
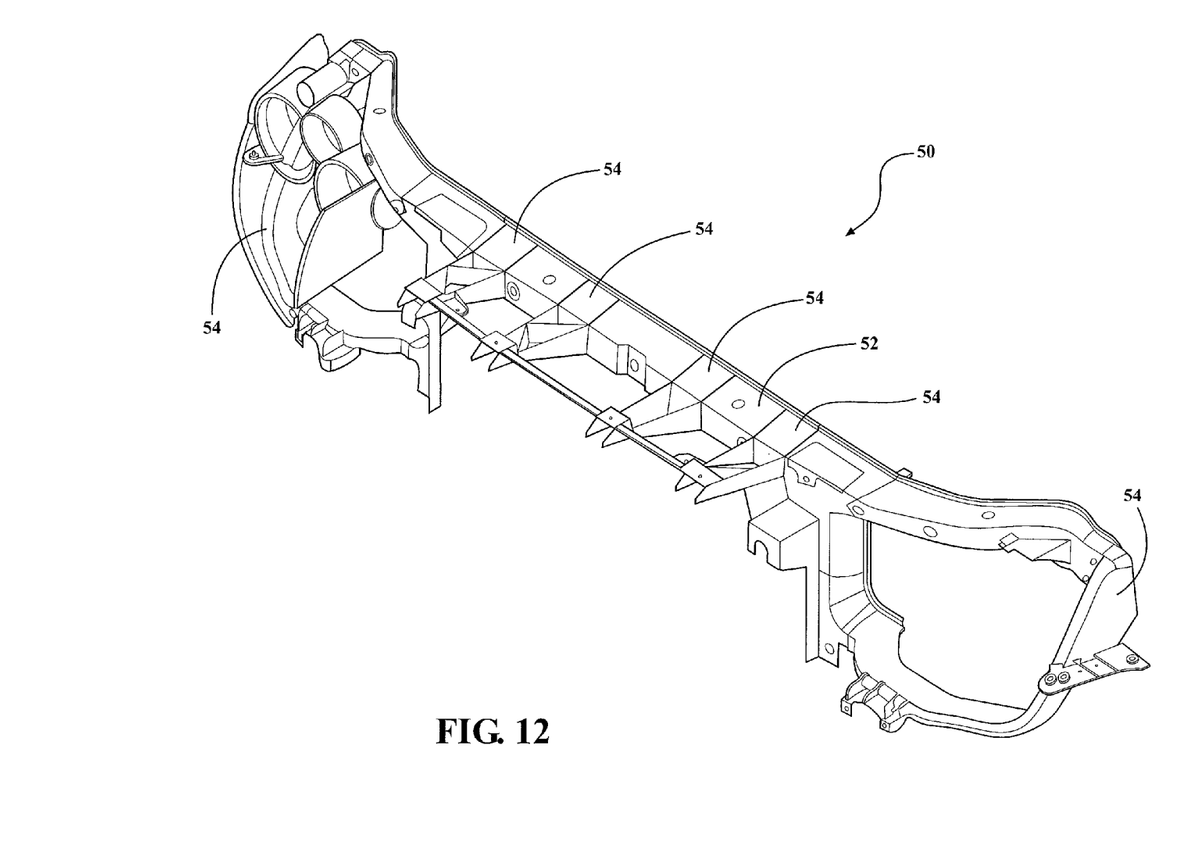
FIG. 12 is a perspective view of a conventional manufactured part.

FIG. 12 is a perspective view of a typical conventional part 50 having a steel beam 52 with plastic overmold 54 attached to portions of the steel structure. The steel beam 52 is inserted into a compression mold and mandrels are inserted into the ends of the steel 52 prior to molding in order to prevent collapse of the steel during the molding process. This process results in a slower cycle time for molding and a heavy and expensive product.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A plastic overmold aluminum extrusion comprising:
at least one aluminum extrusion comprising an internal web structure that includes a plurality of interconnected segments that each extend from the center of the aluminum extrusion radially outward, said internal web structure further includes an inner wall, inner gaps formed by the interconnected segments and inner wall, and outer gaps formed by an outer wall of said aluminum extrusion, inner wall and the interconnected segments, the interconnected segments extending to the outer wall, and said at least one aluminum extrusion with internal web structure withstands predetermined injection and/or compression molding pressures; and
a plastic overmold.

2. The plastic overmold aluminum extrusion of claim 1, wherein the at least one aluminum extrusion has a substantially smooth outer circumferential surface.

3. The plastic overmold aluminum extrusion of claim 1, further comprising a plurality of protrusions affixed to the outer wall of the aluminum extrusion to create mechanical interfaces to the plastic overmold.

4. The plastic overmold aluminum extrusion of claim 3, wherein the plurality of protrusions are selected from the group consisting of ribs, rims, ridges, barbs, teeth, T-shapes, other suitable shapes that protrude from the outer wall for creating mechanical interfaces with the plastic overmold, and combinations thereof.

5. The plastic overmold aluminum extrusion of claim 1, wherein the outer wall has a plurality of localized deformations from a combination of the applied plastic pressure under injection or compression molding pressures and the proximity of the outer gaps that are located between the inner wall and the outer wall of the at least aluminum extrusion, which plurality of localized deformations provide mechanical interfaces with the plastic overmold.

6. The plastic overmold aluminum extrusion of claim 1, wherein at least two aluminum extrusion are integrated into a single structure with the plastic overmold.

7. The plastic overmold aluminum extrusion of claim 1, wherein said plastic overmold aluminum extrusion is a transportation vehicle part selected from the group consisting of front end structures, bumper beams, cross car beams, instrument panel reinforcements, engine cradles, transmission cross members, or any other component requiring improved part geometry and strength, while minimizing weight.

8. The plastic overmold aluminum extrusion of claim 1, wherein the outer wall of the aluminum extrusion that interfaces with the plastic overmold is at least 2.00 millimeters thick.

9. A plastic overmold aluminum extrusion comprising:
at least one aluminum extrusion comprising an internal web structure having a plurality of interconnected segments that are integrally formed and each branching from the center of the aluminum extrusion radially outward to an inner wall of the internal web structure and an outer wall for withstanding a predetermined range of injection and/or compression molding pressures;
a plastic overmold; and
a plurality of protrusions affixed to an outer wall of the aluminum extrusion to create a mechanical interface with the plastic overmold.

10. A process for making a plastic overmold aluminum extrusion comprising:
extruding at least one aluminum extrusion having an internal web structure comprising a plurality of interconnected segments that each extend from the center of the aluminum extrusion radially outward, said internal web structure further includes an inner wall, inner gaps formed by the interconnected segments and inner wall, and outer gaps formed by an outer wall of said aluminum extrusion, inner wall and the interconnected segments, the interconnected segments extending to the outer wall, and said at least one aluminum extrusion with internal web structure withstands predetermined injection and/or compression molding pressures;
inserting the at least one aluminum extrusion into an injection and/or compression mold without a mandrel;
delivering plastic to the mold forming a plastic overmold; and
removing the plastic overmold aluminum extrusion from the mold.

11. The process of claim 10, further comprising the step of welding a plurality of protrusions to an outer wall of the aluminum extrusion for gripping the plastic.

12. The process of claim 11, wherein the plurality of protrusions are selected from the group consisting of ribs, rims, ridges, barbs, teeth, T-shapes, L-shape, any suitable shape that protrudes from the outer wall to create mechanical interfaces with the plastic overmold, and combinations thereof.

13. The process of claim 10, wherein the aluminum extrusion is formed with the outer wall having a thickness operable to allow localized deformations adjacent to the outer gaps that are kidney-like shaped formed between the inner wall and the outer wall of the aluminum extrusion for forming mechanical interfaces with the plastic.

14. The process of claim 10, further comprising extruding the aluminum extrusion with a plurality of protrusions an outer wall of the aluminum extrusion for gripping the plastic.

15. The process of claim 10, further comprising the step of painting the plastic overmold aluminum extrusion.

16. The process of claim 10, further comprising the step of electrocoating the plastic overmold aluminum extrusion.

17. The process of claim 10, further comprising installing the component on a transportation vehicle, wherein said formed plastic overmold aluminum extrusion is a transportation vehicle part selected from the group consisting of front end structures, bumper beams, cross car beams, instrument panel reinforcements, engine cradles, transmission cross members, or any other component requiring improved part geometry and strength, while minimizing weight.

18. The process of claim 10, further comprising inserting a plurality of aluminum extrusion and optionally additional mounting components into the mold and delivering plastic to the mold providing integration of a plurality of aluminum extrusions and components into a single structure.

* * * * *